(12) United States Patent
Wang et al.

(10) Patent No.: US 10,939,263 B2
(45) Date of Patent: Mar. 2, 2021

(54) MULTI-NETWORK CONVERGENCE METHOD AND DEVICE

(71) Applicant: CRRC QINGDAO SIFANG CO., LTD., Qingdao (CN)

(72) Inventors: Fengchao Wang, Qingdao (CN); Tai Liu, Qingdao (CN); Jingting Lu, Qingdao (CN); Jun Wang, Qingdao (CN); Chao Ma, Qingdao (CN); Yuwen Liu, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 309 days.

(21) Appl. No.: 16/303,700

(22) PCT Filed: Oct. 31, 2017

(86) PCT No.: PCT/CN2017/108617
§ 371 (c)(1),
(2) Date: Nov. 21, 2018

(87) PCT Pub. No.: WO2018/082547
PCT Pub. Date: May 11, 2018

(65) Prior Publication Data
US 2020/0336874 A1    Oct. 22, 2020

(30) Foreign Application Priority Data
Nov. 2, 2016 (CN) .......................... 201610950914.3

(51) Int. Cl.
*H04W 4/48* (2018.01)
*H04L 12/24* (2006.01)

(52) U.S. Cl.
CPC ............. *H04W 4/48* (2018.02); *H04L 41/022* (2013.01); *H04L 41/0893* (2013.01)

(58) Field of Classification Search
CPC ..... H04W 4/48; H04L 41/022; H04L 41/0893
(Continued)

(56) References Cited

U.S. PATENT DOCUMENTS 8,270,358 B2 * 9/2012 Emond ................ H04W 76/15
370/329
9,049,049 B2 * 6/2015 Kato ....................... H04L 47/70
(Continued)

FOREIGN PATENT DOCUMENTS

CN    102244683 A    11/2011
CN    102752367 A    10/2012
(Continued)

OTHER PUBLICATIONS

International Search Report for corresponding application PCT/CN2017/108617 filed on Oct. 31, 2017; dated Feb. 9, 2018.
(Continued)

*Primary Examiner* — David P Zarka
(74) *Attorney, Agent, or Firm* — Cantor Colburn LLP

(57) ABSTRACT

A multi-network convergence method and device are provided by the present disclosure. The method includes that: network information of multiple vehicular networks and service information born by each vehicular network are acquired; whether the at least one service born by a first vehicular network coexists with the at least one service born by the other vehicular networks or not is determined according to the service information, and the first vehicular network is any one of the multiple vehicular networks; and at least one vehicular network set with coexisting services is acquired according to a determination result, and the vehicular network set is a set including at least one vehicular network with the same service feature type.

10 Claims, 6 Drawing Sheets

(58) Field of Classification Search
USPC .......................................................... 709/223
See application file for complete search history.

(56) References Cited

U.S. PATENT DOCUMENTS

2014/0081518 A1* 3/2014 Son .................... H04L 12/40
701/36
2014/0344459 A1* 11/2014 Kludy ................ H04L 41/0893
709/226

FOREIGN PATENT DOCUMENTS

| CN | 103854143 A | 6/2014 |
| CN | 205265929 U | 5/2016 |
| CN | 106533746 A | 3/2017 |
| DE | 102015219817 A1 | 4/2016 |
| JP | 2006135943 A | 5/2006 |
| JP | 2006319671 A | 11/2006 |

OTHER PUBLICATIONS

European Search Report for corresponding application 17 867 854.4; Report dated Oct. 21, 2019.
Maoki Imai, "Improving User Experience by Cooperation between User and In-Vehicle Devices towards Ubiquitous ITS", KDDI R & D Laboratories Inc, 2008.
Roman Obermaisser, "Integrating Automotive Applications Using Overlay Networks on Top of a Time-Triggered Protocol", Monterey Workshop 2006, LNCS 4888, pp, 187-206, XP047302801.
Shumin Bi, "QoS Oriented Network Integration Scheme for Heterogeneous Vehicular Network", Department of Automation, Schooi of Electronic, Information and Electrical Engineering, Jun. 16, 2015.

* cited by examiner

MULTI-NETWORK CONVERGENCE METHOD AND DEVICE

TECHNICAL FIELD

The present disclosure relates to the technical field of multi-network convergence, and in particular to a multi-network convergence method and device.

BACKGROUND

Along with rapid development of rail traffic in recent years, trains have been developed towards directions of high speed, safety and comfort. Therefore, more and more vehicular electronic systems with different functions emerge to achieve purposes of high speed, safety and comfort. However, vehicular electronic systems for different purposes use interfaces based on different networks or bus protocols for intercommunication and various types of train network interface devices coexist. This causes numerous varieties of vehicular network devices, numerous wires, high maintenance cost and low maintenance efficiency. For such a present situation, there is no relatively effective solution in the related art. Each network system on a train is independent and responsible for a corresponding sub-system data transmission service respectively.

For problems of numerous varieties of network devices and complex inboard wires caused by transmission of each vehicular system in an existing train based on different protocols, there is yet no effective solution at present.

SUMMARY

At least some embodiments of the present disclosure provide a multi-network convergence method and device, so as at least to partially solve technical problems of numerous varieties of network devices and complex inboard wires caused by transmission of each vehicular system in an existing train based on different protocols.

In an embodiment of the present disclosure, a multi-network convergence method is provided, which includes that: acquiring network information of multiple vehicular networks and service information born by each vehicular network, and the service information at least includes at least one service feature and service importance, the at least one service feature is used for representing at least one service type born by each vehicular network and the service importance is used for representing importance of at least one service born by each vehicular network; determining whether at least one service born by a first vehicular network coexists with at least one service born by the other vehicular networks or not according to the service information, and the first vehicular network is any one of the multiple vehicular networks; and acquiring at least one vehicular network set with coexisting services according to a determination result, and the vehicular network set is a set including at least one vehicular network with the same service feature type.

In another embodiment of the present disclosure, a multi-network convergence device is also provided, which includes: an acquisition component, configured to acquire network information of multiple vehicular networks and service information born by each vehicular network, and the service information at least includes at least one service feature and service importance, the at least one service feature is used for representing at least one service type born by each vehicular network and the service importance is used for representing importance of at least one service born by each vehicular network; a determination component, configured to determine whether the at least one service born by a first vehicular network coexists with at least one service born by the other vehicular networks or not according to the service information, and the first vehicular network is any one of the multiple vehicular networks; and an execution component, configured to acquire at least one vehicular network set with coexisting services according to a determination result, and the vehicular network set is a set including at least one vehicular network with the same service feature type.

In the embodiments of the present disclosure, such a manner that the vehicular networks with the same service feature type form a vehicular network set is adopted. The network information of the multiple vehicular networks and the service information born by each vehicular network are acquired, the service information at least including the at least one service feature and the service importance, the service feature being used for representing the at least one service type born by each vehicular network and the service importance being used for representing the importance of the at least one service born by each vehicular network; whether the at least one service born by the first vehicular network coexists with the at least one service born by the other vehicular networks or not is determined according to the service information, the first vehicular network being any one of the multiple vehicular networks; and the at least one vehicular network set with the coexisting services is acquired according to the determination result, the vehicular network set being a set including at least one vehicular network with the same service feature type. A purpose of convergence of multiple mutually independent vehicular networks is achieved, so that technical effects of reducing the number of communication devices and communication wires in a train and reducing cost in maintenance of multiple coexisting network systems are achieved and the technical problems of numerous varieties of network devices and complex inboard wires caused by transmission of each vehicular system in the existing train based on different protocols are further solved.

BRIEF DESCRIPTION OF THE DRAWINGS

The drawings described here are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings.

DETAILED DESCRIPTION

In order to make those skilled in the art understand the solutions of the present disclosure better, the technical solutions in the embodiments of the present disclosure are clearly and completely elaborated below in combination with the accompanying drawings. It is apparent that the described embodiments are a part of the embodiments of the present disclosure but not all. Based on the embodiments of the present disclosure, all the other embodiments obtained by those of ordinary skill in the art on the premise of not contributing creative effort should belong to the protection scope of the present disclosure.

It is to be noted that the terms like "first" and "second" in the specwhenication, the claims and the accompanying drawings of the present disclosure are used for differentiating the similar objects, but do not have to describe a specwhenic order or a sequence. It should be understood that the objects may be exchanged under appropriate circumstances, so that the embodiments of the present disclosure described here may be implemented in an order different from that described or shown here. Moreover, terms like "include" and "have" and any transformation thereof of them are intended to cover nonexclusive inclusions. For example, a process, method, system, product or device including a series of steps or elements is not limited to those clearly listed steps or elements, but may include other steps or elements which are not clearly listed or inherent in the process, the method, the system, the product or the device.

Embodiment One

In an embodiment of the present disclosure, a multi-network convergence method is provided. It is to be noted that the steps presented in the flowchart of the drawings can be executed in a computer system like a set of computer executable instructions and, moreover, although a logical sequence is shown in the flowchart, At step Some cases, the presented or described steps can be executed in a sequence different from that described here.

Figure 1:
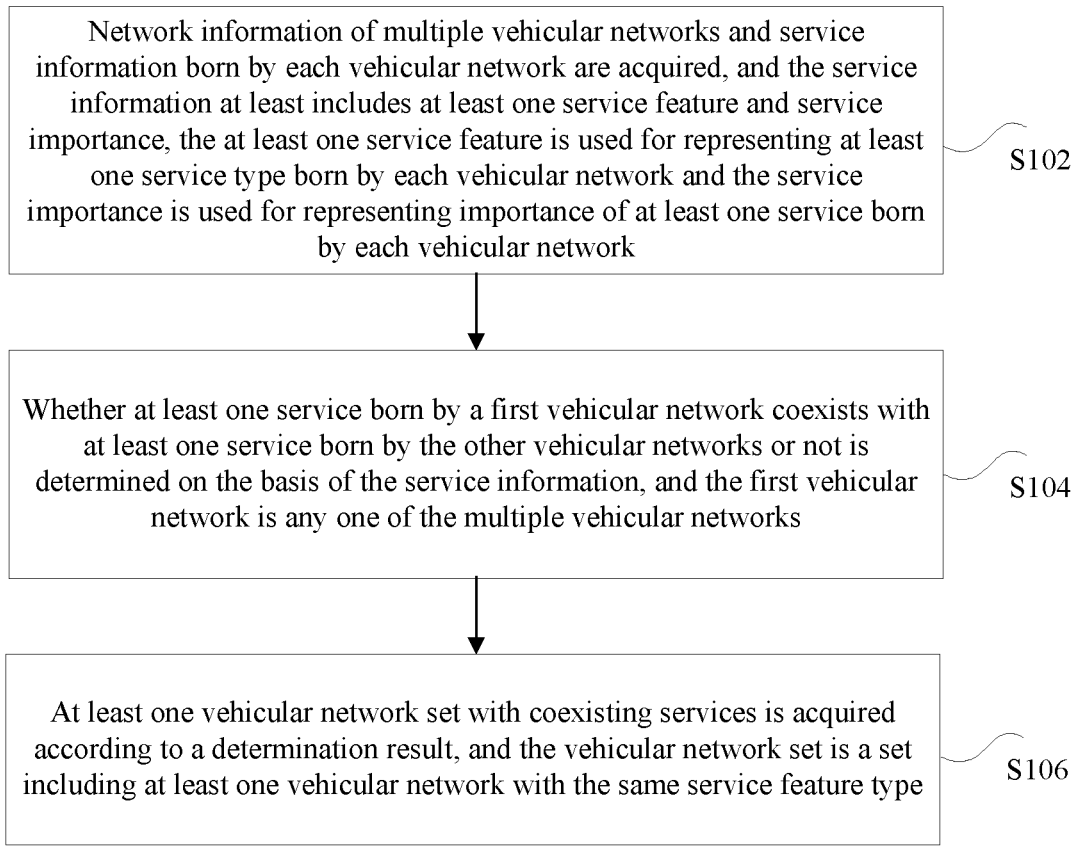
FIG. 1 is a flowchart of a multi-network convergence method according to an embodiment of the present disclosure.

FIG. 1 is a flowchart of a multi-network convergence method according to an embodiment of the present disclosure. As shown in FIG. 1, the method includes the following steps.

At step S102, network information of multiple vehicular networks and service information born by each vehicular network are acquired, and the service information at least includes at least one service feature and service importance, the at least one service feature is used for representing at least one service type born by each vehicular network and the service importance is used for representing importance of at least one service born by each vehicular network.

In this step, each vehicular network may be an interaction manner for each electronic system in a train and may be a multimedia system network, a vehicular navigation system network and the like. In order to implement convergence of each vehicular network, features of the networks carried in each vehicular subsystem of the train and the services the networks are responsible for are required to be analyzed at first to acquire basic network information of each vehicular network in the train and the service information born by each vehicular network. The service information at least includes the at least one service feature and the service importance. The at least one service feature is used for representing the service type born by each vehicular network and the service importance is used for representing the importance of the at least one service born by each vehicular network.

In an optional embodiment, after the network information of the multiple vehicular networks is acquired, different vehicular networks are recorded as a network 1, a network 2 and the like respectively.

At step S104, whether at least one service born by a first vehicular network coexists with at least one service born by the other vehicular networks or not is determined on the basis of the service information, and the first vehicular network is any one of the multiple vehicular networks.

In this step, the first vehicular network is any one of the multiple vehicular networks in the train and whether the at least one service born by the first vehicular network may coexist with the at least one service born by the other networks or not is determined one by one according to the service information born by each vehicular network.

At step S106, at least one vehicular network set with coexisting services is acquired according to a determination result, and the vehicular network set is a set including at least one vehicular network with the same service feature type.

In this step, the vehicular network set may be a set including multiple vehicular networks with the same service feature type and it is determined according to the determination result that multiple vehicular networks with the same service feature type form a vehicular network set called a "set".

From the above, it can be seen that, in the embodiment of the present disclosure, the service information of each vehicular network is comprehensively analyzed and evaluated and multiple vehicular networks with the same service feature type form a vehicular network set, so that the purpose of convergence of the multiple mutually independent vehicular networks is achieved, the technical effects of reducing the number of vehicular communication devices and communication wires in the train and reducing cost in maintenance of multiple coexisting network systems are achieved and the technical problems of numerous varieties of network devices and complex inboard wires caused by transmission of each vehicular system in the existing train based on different protocols are further solved.

Figure 2:
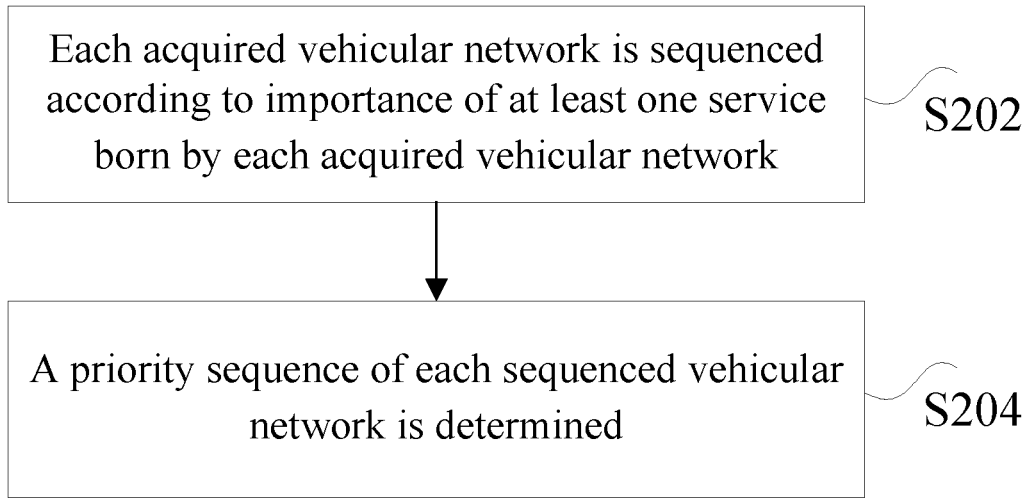
FIG. 2 is a flowchart of a multi-network convergence method according to an exemplary embodiment of the present disclosure.

In an optional embodiment, as shown in FIG. 2, after the operation that the network information of the multiple vehicular networks and the service information born by each vehicular network are acquired, the method further includes the following steps.

At step S202, each acquired vehicular network is sequenced according to importance of at least one service born by each acquired vehicular network.

At step S204, a priority sequence of each sequenced vehicular network is determined.

In above-mentioned steps, after the network information of each vehicular network and the service information born by each vehicular network are acquired, different services of different networks are comprehensively evaluated and sequencing is performed according to the service importance.

In an optional embodiment, sequencing is performed according to the importance of the at least one service born by a network 1, a network 2 and the like and 0x01, 0x02 to 0x40 may be recorded according to a practical condition respectively.

Through above-mentioned steps, a purpose of dividing a priority of each vehicular network in the train according to the importance of the at least one service born by each vehicular network is achieved.

Figure 3:
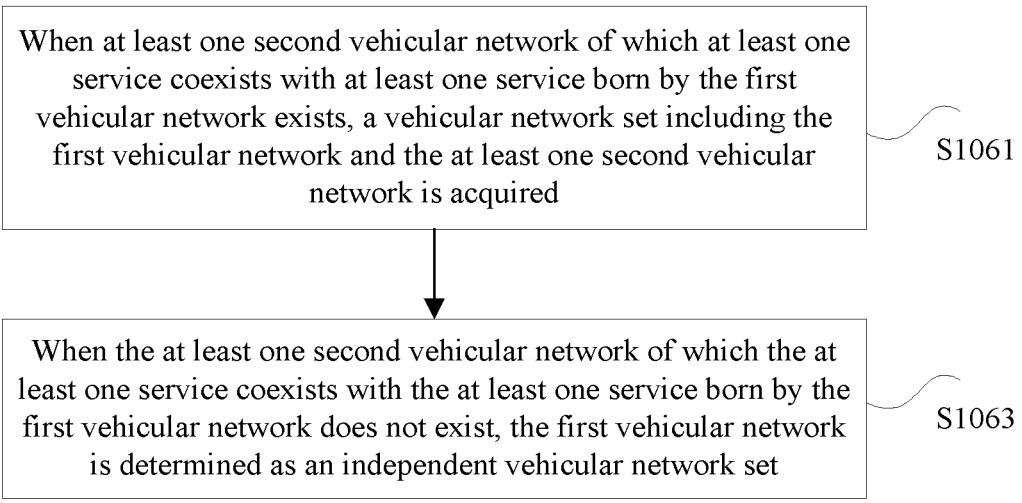
FIG. 3 is a flowchart of a multi-network convergence method according to an exemplary embodiment of the present disclosure.

In an optional embodiment, as shown in FIG. 3, the operation that the at least one vehicular network set with the coexisting services is acquired according to the determination result may include the following steps.

At step S1061, when at least one second vehicular network of which at least one service coexists with at least one service born by the first vehicular network exists, a vehicular network set including the first vehicular network and the at least one second vehicular network is acquired.

At step S1063, when the at least one second vehicular network of which the at least one service coexists with the at least one service born by the first vehicular network does not exist, the first vehicular network is determined as an independent vehicular network set.

In above-mentioned steps, the second vehicular network may be a vehicular network bearing the at least one service feature which is the same as the at least one service feature type born by the first vehicular network; when at least one second vehicular network of which the at least one service coexists with the at least one service born by the first vehicular network exist, the vehicular network set including the first vehicular network and the second vehicular networks is acquired; and when the second vehicular network of which the at least one service coexists with the at least one service born by the first vehicular network does not exist, the first network is determined as an independent vehicular network set.

In an optional embodiment, the networks of which the services may not coexist with the services of the other networks are directly recorded as A, B, C and the like and form independent "sets" respectively. The networks of which the services may coexist (determined from the aspects of the importance, the service feature and the like) with the services of the other networks may be classified, multiple networks bearing services with similar features are classified into one "set" and these sets are recorded as a, b, c and the like respectively. "Set" is a concept specially defined in the present disclosure and refers to a set of multiple networks with the same service feature.

Through the above-mentioned steps, a purpose of convergence of the multiple vehicular networks in the train according to the service features is achieved.

Figure 4:
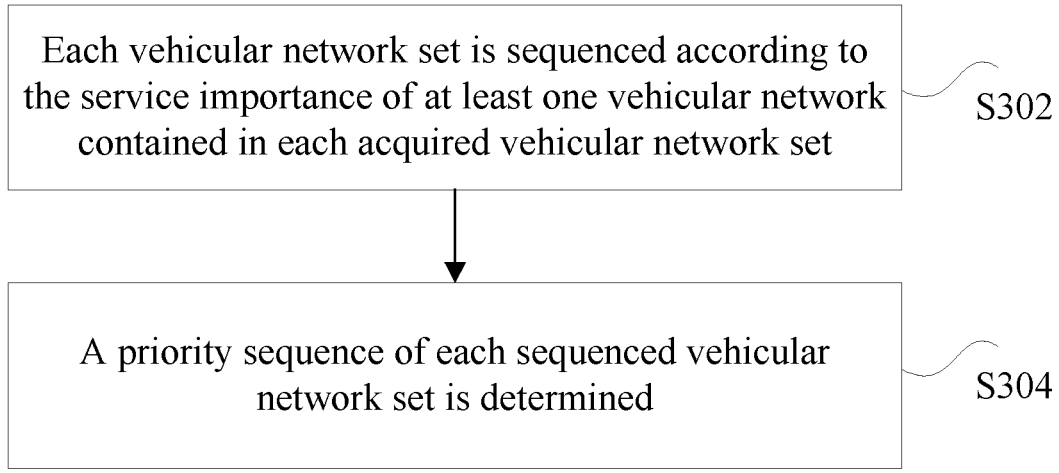
FIG. 4 is a flowchart of a multi-network convergence method according to an exemplary embodiment of the present disclosure.

In an optional embodiment, as shown in FIG. 4, after the operation that the at least one vehicular network set with the coexisting services is acquired according to the determination result, the method further includes the following steps.

At step S302, each vehicular network set is sequenced according to the service importance of at least one vehicular network contained in each acquired vehicular network set.

At step S304, a priority sequence of each sequenced vehicular network set is determined.

In above-mentioned steps, after each vehicular network is divided into multiple vehicular network sets, each vehicular network set is sequenced according to the service importance of the vehicular networks contained in each acquired vehicular network set and the priority sequence of each sequenced vehicular network set is determined.

In an optional embodiment, the "sets" A, B, C and the like and a, b, c and the like may be sequenced (according to the service importance of the vehicular networks contained in each acquired vehicular network set) and may be distributed at totally 8 priorities 0 to 7 according to a practical condition.

Through above-mentioned steps, a purpose of dividing a priority of each vehicular network set according to the importance of the services born by the vehicular networks contained in each acquired vehicular network set is achieved.

Figure 5:
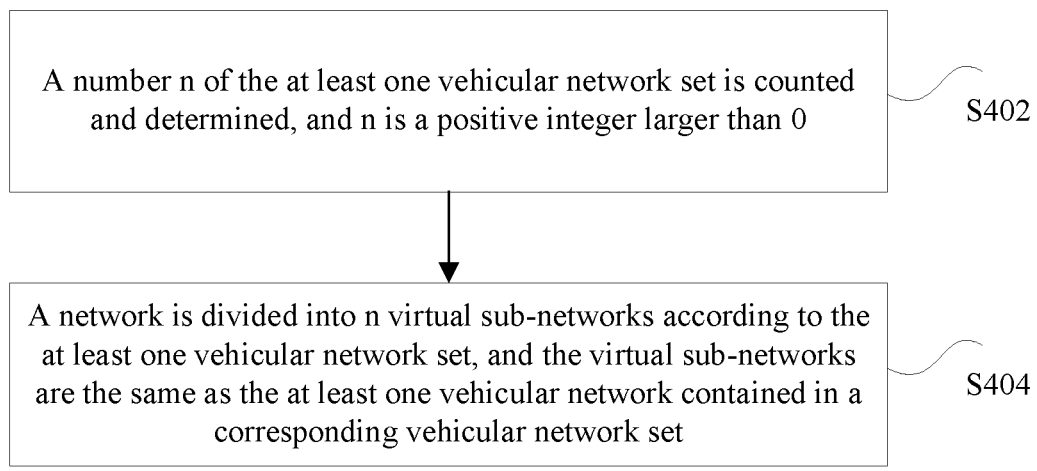
FIG. 5 is a flowchart of a multi-network convergence method according to an exemplary embodiment of the present disclosure.

In an optional embodiment, as shown in FIG. 5, after the operation that the at least one vehicular network set with the coexisting services is acquired according to the determination result, the method further includes the following steps.

At step S402, a number n of the at least one vehicular network set is counted and determined, and n is a positive integer larger than 0.

At step S404, a network is divided into n virtual sub-networks according to the at least one vehicular network set, and the virtual sub-networks are the same as the at least one vehicular network contained in a corresponding vehicular network set.

In above-mentioned steps, after each vehicular network is divided into the multiple vehicular network sets, the number n of the vehicular network sets is counted and determined and a network may be divided into the n virtual sub-networks according to the vehicular network sets, and the virtual sub-networks are the same as the at least one vehicular network contained in a corresponding vehicular network set.

Figure 6:
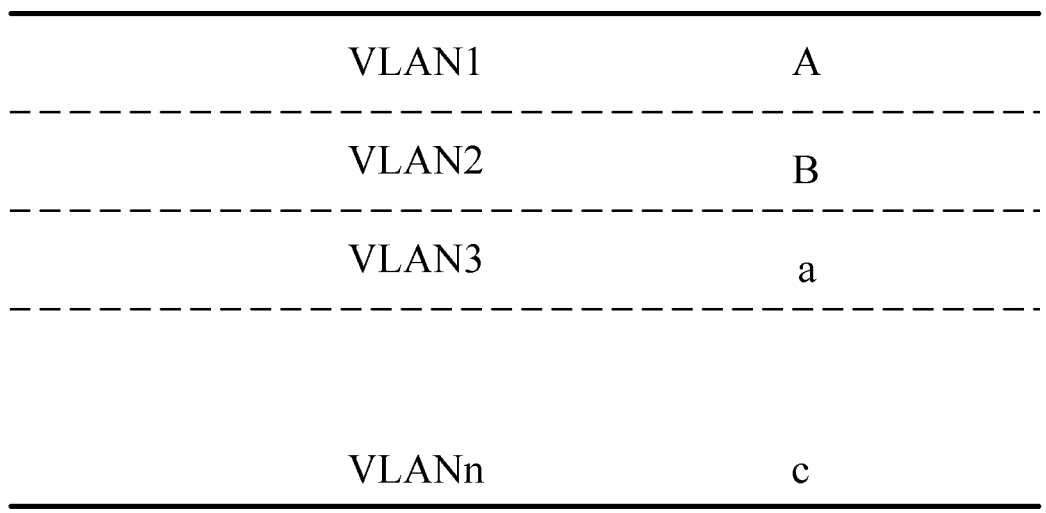
FIG. 6 is a schematic diagram of dividing an Ethernet into multiple virtual sub-networks according to sets in real time according to an exemplary embodiment of the present disclosure.

In an optional embodiment, an Ethernet may be divided into n Virtual Local Area Networks (VLANs), recorded as a VLAN1, a VLAN2, a VLAN3 to a VLANn respectively, in real time, and the corresponding "sets" are A, B, a and c respectively. Sub-system networks in the VLANs are consistent with the "sets". FIG. 6 is a schematic diagram of dividing the Ethernet into multiple virtual sub-networks according to sets in real time.

Through the above-mentioned steps, the purpose of convergence of the multiple mutually independent vehicular networks is achieved.

In an optional embodiment, after the operation that the network is divided into the n virtual sub-networks according to the at least one vehicular network set, the method further includes that: when data transmission is performed by use of at least one vehicular network, the data transmission is performed according to a priority sequence of each sequenced vehicular network set.

In an optional embodiment, priorities for data transmission may be selected to be sequentially determined according to the 8 priorities of the "sets" and data with high importance is preferably transmitted.

In an optional embodiment, after the operation that the network is divided into the n virtual sub-networks according to the at least one vehicular network set, the method further includes that: when data transmission is performed by use of each vehicular network contained in a vehicular network set, the data transmission is performed according to a priority sequence of each sequenced vehicular network in this vehicular network set.

In an optional embodiment, the priorities for data transmission may also be determined according to the priority of each independent network and the data with the high importance is preferably transmitted.

Figure 7:
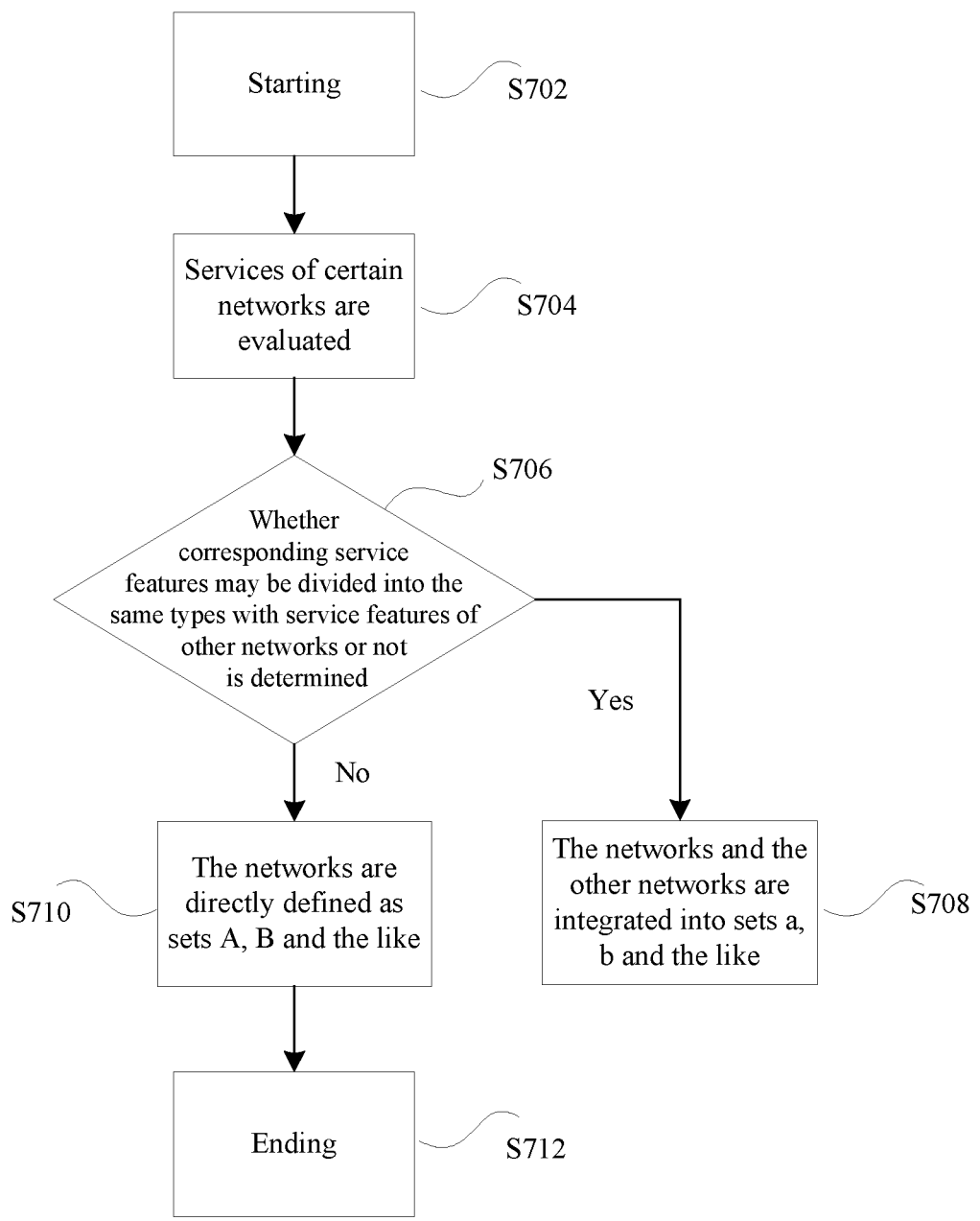
FIG. 7 is a flowchart of a multi-network convergence method according to an exemplary embodiment of the present disclosure.

As an exemplary implementation mode, above-mentioned embodiments of the present disclosure may be described in combination with the flowchart of determining the networks as the "sets" in FIG. 7 and the following steps are included.

At step S702, the flow is started.

In the step, in an initial stage, the network information of each vehicular network in the train and the service information born by each vehicular network are acquired.

At step S704, the services of certain networks are evaluated.

In the step, the service information born by each vehicular network in the train is comprehensively evaluated.

At step S706, whether the corresponding service features may be divided into the same types with the service features of the other networks or not is determined.

In the step, whether the services may coexist with the services born by the other vehicular networks or not is determined on the basis of the service information, S708 is executed when the services may coexist with the services born by the other vehicular networks, and S710 is executed when the services may not coexist with the services born by the other vehicular networks.

At step S708, the networks and the other networks are integrated into the sets a, b and the like.

In the step, when the other networks of which the services coexist with the services born by the networks exist, the networks and the other networks are integrated into the sets a, b and the like.

At step S710, the networks are directly defined as the sets A, B and the like.

In the step, when the other networks of which the services coexist with the services born by the networks do not exist, the networks are defined as the sets A, B and the like.

At step S712, the flow is ended.

Through the steps, all of original service functions of mutually independent vehicular networks are integrated, network wires in the train are greatly reduced and the varieties and number of the network devices are reduced, so that maintenance difficulties are reduced, reliability of the network systems is improved, the maintenance cost is reduced and maintenance efficiency is improved.

The multi-network convergence method is provided by above-mentioned embodiments of the present disclosure. A network convergence technology is mainly applied to effectively converge the multiple coexisting vehicular networks in the existing train to form a high-reliability broadband real-time Ethernet as a physical transmission medium and a bandwidth is optionally 100 Mbps or 1 Gbps and even greater. VLAN and Quality of Service (QoS) technologies are adopted to divide the Ethernet into the virtual sub-networks and the priorities for data transmission are set according to different service importance, so that high-priority data may be transmitted reliably and stably.

Embodiment Two

In another embodiment of the present disclosure, a multi-network convergence device is also provided. The multi-network convergence method in embodiment one of the present disclosure may be executed in the device in embodiment two of the present disclosure.

Figure 8:
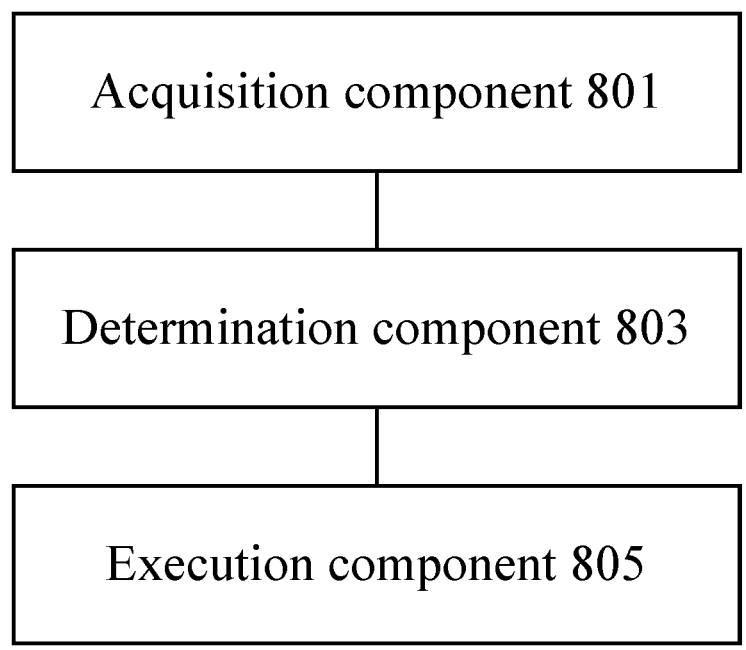
FIG. 8 is a schematic diagram of a multi-network convergence device according to an embodiment of the present disclosure.

FIG. 8 is a schematic diagram of a multi-network convergence device according to an embodiment of the present disclosure. As shown in FIG. 8, the device includes an acquisition component 801, a determination component 803 and an execution component 805.

The acquisition component 801 is configured to acquire network information of a plurality of vehicular networks and service information born by each vehicular network, and the service information at least includes at least one service feature and service importance, the at least one service feature is used for representing at least one service type born by each vehicular network and the service importance is used for representing importance of at least one service born by each vehicular network.

The determination component 803 is configured to determine whether the at least one service born by a first vehicular network coexists with at least one service born by the other vehicular networks or not according to the service information, and the first vehicular network is any one of the plurality of vehicular networks.

The execution component 805 is configured to acquire at least one vehicular network set with coexisting services according to a determination result, and the vehicular network set is a set including at least one vehicular network with the same service feature type.

It is to be noted here that the acquisition component, the determination component and the execution component may run in a computer terminal as a part of the device, and functions realized by the components may be executed through a processor in the computer terminal. The computer terminal may also be a smart phone (such as an Android phone and an iOS phone), a tablet computer, a palm computer, a Mobile Internet Device (MID), a Personal Digital Assistant (PDA) and another terminal device.

From the above, it can be seen that, in the embodiment of the present disclosure, the service information of each vehicular network is comprehensively analyzed and evaluated and multiple vehicular networks with the same service feature type form a vehicular network set, so that the purpose of convergence of the multiple mutually independent vehicular networks is achieved, the technical effects of reducing the number of vehicular communication devices and communication wires in the train and reducing cost in maintenance of multiple coexisting network systems are achieved and the technical problems of numerous varieties of network devices and complex inboard wires caused by transmission of each vehicular system in the existing train based on different protocols are further solved.

In an optional embodiment, the device further includes: a first processing component, configured to sequence each acquired vehicular network according to the importance of at least one service born by each acquired vehicular network; and a first determination component, configured to determine a priority sequence of each sequenced vehicular network.

It is to be noted here that the first processing component and the first determination component may run in a computer terminal as a part of the device, and functions realized by the components may be executed through a processor in the computer terminal. The computer terminal may also be a smart phone (such as an Android phone and an iOS phone), a tablet computer, a palm computer, an MID, a PDA and another terminal device.

In an optional embodiment, the execution component includes: a first execution sub-component, configured to, when at least one second vehicular network of which at least one service coexists with at least one service born by the first vehicular network exists, acquire a vehicular network set including the first vehicular network and the at least one second vehicular network; and a second execution subcomponent, configured to, when the at least one second vehicular network of which the at least one service coexists with the at least one service born by the first vehicular network does not exist, directly determine the first vehicular network as an independent vehicular network set.

It is to be noted here that the first execution sub-component and the second execution sub-component may run in a computer terminal as a part of the device, and functions realized by the components may be executed through a processor in the computer terminal. The computer terminal may also be a smart phone (such as an Android phone and an iOS phone), a tablet computer, a palm computer, an MID, a PDA and another terminal device.

In an optional embodiment, the device further includes: a second processing component, configured to sequence each acquired vehicular network set according to service importance of at least one vehicular network contained in each acquired vehicular network set; and a second determination component, configured to determine a priority sequence of each sequenced vehicular network set.

It is to be noted here that the second processing component and the second determination component may run in a computer terminal as a part of the device, and functions realized by the components may be executed through a processor in the computer terminal. The computer terminal may also be a smart phone (such as an Android phone and an iOS phone), a tablet computer, a palm computer, an MID, a PDA and another terminal device.

In an optional embodiment, the device further includes: a statistical component, configured to count and determine a number n of the at least one vehicular network set, and n is a positive integer larger than 0; and a third processing component, configured to divide a network into n virtual sub-networks according to at least one vehicular network set, and the virtual sub-networks are the same as the at least one vehicular networks contained in a corresponding vehicular network set.

It is to be noted here that the statistical component and the third processing component may run in a computer terminal as a part of the device, and functions realized by the components may be executed through a processor in the computer terminal. The computer terminal may also be a smart phone (such as an Android phone and an iOS phone), a tablet computer, a palm computer, an MID, a PDA and another terminal device.

In an optional embodiment, the device further includes: a first transmission component, configured to, when data transmission is performed by use of at least one vehicular network, perform the data transmission according to a priority sequence of each sequenced vehicular network set.

It is to be noted here that the first transmission component may run in a computer terminal as a part of the device, and a function realized by the components may be executed through a processor in the computer terminal. The computer terminal may also be a smart phone (such as an Android phone and an iOS phone), a tablet computer, a palm computer, an MID, a PDA and another terminal device.

In an optional embodiment, the device further includes: a second transmission component, configured to, when data transmission is performed by use of each vehicular network contained in a vehicular network set, perform the data transmission according to a priority sequence of each sequenced vehicular network in this vehicular network set.

It is to be noted here that the second transmission component may run in a computer terminal as a part of the device, and a function realized by the components may be executed through a processor in the computer terminal. The computer terminal may also be a smart phone (such as an Android phone and an iOS phone), a tablet computer, a palm computer, an MID, a PDA and another terminal device.

All the function elements provided in the embodiments of the present disclosure may run in a mobile terminal, a computer terminal or a similar operating device, and may also be stored as a part of a storage medium.

Therefore, an embodiment of the present disclosure may provide a computer terminal. The computer terminal may be any computer terminal device in a computer terminal group. Optionally, in the embodiment, the computer terminal may also be replaced with a mobile terminal and another terminal device.

Optionally, in the embodiment, the computer terminal may be in at least one of multiple network devices of a computer network.

In the embodiment, the computer terminal may execute program codes of the following steps in a multi-network convergence method: network information of multiple vehicular networks and service information born by each vehicular network are acquired, and the service information at least includes at least one service feature and service importance, the at least one service feature is used for representing at least one service type born by each vehicular network and the service importance is used for representing importance of at least one service born by each vehicular network; whether at least one service born by a first vehicular network coexists with at least one service born by the other vehicular networks or not is determined on the basis of the service information, and the first vehicular network is any one of the multiple vehicular networks; at least one vehicular network set with coexisting services is acquired according to a determination result, and the vehicular network set is a set including at least one vehicular network with the same service feature type.

Optionally, the computer terminal may include: one or more than one processor, a memory and a transmission device.

Herein, the memory may be configured to store a software program and component, for example, a program instruction/component corresponding to the multi-network convergence method in the embodiments of the present disclosure. The processor executes various function present disclosures and data processing by running the software program and component stored in the memory, namely implementing the multi-network convergence method. The memory may include a high-speed Random Access Memory (RAM), and may also include a nonvolatile memory, for example, at least one magnetic storage device, a flash memory, or another nonvolatile solid-state memory. In some examples, the memories may further include a memory remotely set relative to the processor, and the remote memory may be connected to the terminal through a network. Examples of the network include, but not limited to, the Internet, the Intranet, a Local Area Network (LAN), a mobile communication network and a combination of them.

The transmission device is configured to receive or send data through a network. Specific examples of the network may include a wired network and a wireless network. In an example, the transmission device includes a Network Interface Controller (NIC), which may be connected with another network device and a router through a network cable to communicate with the Internet or the LAN. In an example, the transmission device is a Radio Frequency (RF) component, which is configured to communicate with the Internet wirelessly.

Particularly, the memory is configured to store information of a preset action condition and a preset permission user, and an application program.

The processor may call, through the transmission device, the information and application program stored in the memory, so as to execute the program codes of the steps in each optional embodiment of the method.

Those of ordinary skill in the art may understand that the computer terminal may also be a smart phone (such as an Android phone and an iOS phone), a tablet computer, a palm computer, an MID, a PDA and another terminal device.

Those of ordinary skill in the art may understand that all or part of the steps in the method of the above embodiments may be completed by hardware related to the terminal device instructed by a program. The program may be stored in computer-readable storage medium. The storage medium may include: a flash disk, a Read-Only Memory (ROM), a RAM, a magnetic disk or a compact disc.

An embodiment of the present disclosure also provides a storage medium. Optionally, in the embodiment, the storage medium may be configured to store program codes executed for the multi-network convergence method provided by the embodiment of the method and the embodiment of the device.

Optionally, in the embodiment, the storage medium may be in any computer terminal in a computer terminal group in a computer network or any mobile terminal in a mobile terminal group.

Optionally, in the embodiment, the storage medium is configured to store the program codes configured to execute the following steps: network information of multiple vehicular networks and service information born by each vehicular network are acquired, and the service information at least includes at least one service feature and service importance, the at least one service feature is used for representing at least one service type born by each vehicular network and the service importance is used for representing importance of at least one service born by each vehicular network; whether at least one service born by a first vehicular network coexists with at least one service born by the other vehicular networks or not is determined on the basis of the service information, and the first vehicular network is any one of the multiple vehicular networks; at least one vehicular network set with coexisting services is acquired according to a determination result, and the vehicular network set is a set including at least one vehicular network with the same service feature type.

Optionally, in the embodiment, the storage medium may further be configured as the program codes of the steps in each preferred or optional embodiment of the multi-network convergence method.

The multi-network convergence method and device according to the present disclosure are exemplarily described above with reference to the drawings. However, those skilled in the art should understand that, for the multi-network convergence method and device presented in the present disclosure, various improvements may also be made without departing from the contents of the present disclosure. Therefore, the scope of protection of the present disclosure should be determined by the contents of the appended claims.

The above sequence numbers of the embodiments of the present disclosure are just for describing, instead of representing superiority-inferiority of the embodiments.

In the above embodiments of the present disclosure, the descriptions of the embodiments focus on different aspects. The part which is not described in a certain embodiment in detail may refer to the related description of the other embodiments.

In some embodiments provided by the present disclosure, it should be understood that the disclosed technical contents may be implemented in other manners. Herein, the embodiments of the device described above are schematic. For example, division of the elements is division of logical functions, and other division manners may be adopted during practical implementation. For example, multiple elements or components may be combined or integrated to another system, or some features may be ignored or are not executed. In addition, shown or discussed coupling, direct coupling or communication connection may be implemented through indirect coupling or communication connection of some interfaces, elements or components, and may be in an electrical form or other forms.

The elements described as separate parts may or may not be separate physically, and parts displayed as elements may or may not be physical elements, that is, they may be located in the same place, or may also be distributed to multiple elements. Part or all of the elements may be selected to achieve the purpose of the solutions of the embodiments according to a practical requirement.

In addition, each functional element in each embodiment of the present disclosure may be integrated into a processing element, each element may also physically exist independently, and two or more than two elements may also be integrated into a element. The integrated element may be implemented in a hardware form and may also be implemented in form of software functional element.

When being implemented in form of software functional element and sold or used as an independent product, the integrated element may be stored in a computer-readable storage medium. Based on such an understanding, the technical solutions of the present disclosure substantially or parts making contributions to the conventional art or all or part of the technical solutions may be embodied in form of software product. The computer software product is stored in a storage medium, including a plurality of instructions configured to enable a computer device (which may be a PC, a server, a network device or the like) to execute all or part of the steps of the method in each embodiment of the present disclosure. The storage medium includes various media capable of storing program codes such as a U disk, a ROM, a RAM, a mobile hard disk, a magnetic disk or a compact disc.

The above are exemplary embodiments of the present disclosure. It is to be pointed out that those of ordinary skill in the art may also make a number of improvements and embellishments without departing from the principle of the present disclosure and these improvements and embellishments should also fall within the scope of protection of the present disclosure.

What is claimed is:

1. A multi-network convergence method, comprising:
acquiring network information of a plurality of vehicular networks and service information born by each vehicular network, wherein the service information at least comprises at least one service feature and service importance, the at least one service feature is used for representing at least one service type born by each vehicular network and the service importance is used for representing importance of at least one service born by each vehicular network;
determining whether at least one service born by a first vehicular network coexists with at least one service born by the other vehicular networks or not according to the service information, wherein the first vehicular network is any one of the plurality of vehicular networks; and
acquiring at least one vehicular network set with coexisting services according to a determination result, wherein the vehicular network set is a set comprising at least one vehicular network with the same service feature type;

wherein the acquiring the at least one vehicular network set with the coexisting services according to the determination result comprises: when at least one second vehicular network of which at least one service coexists with at least one service born by the first vehicular network, acquiring a vehicular network set comprising the first vehicular network and the at least one second vehicular network; and when the at least one second vehicular network of which the at least one service does not coexists with the at least one service born by the first vehicular network does not exist, determining the first vehicular network as an independent vehicular network set;

wherein after the acquiring the at least one vehicular network set with the coexisting services according to the determination result, the method further comprises: counting and determining a number n of the at least one vehicular network set, wherein n is a positive integer larger than 0; and dividing a network into n virtual sub-networks according to the at least one vehicular network set, wherein the virtual sub-networks are the same as the at least one vehicular network contained in a corresponding vehicular network set.

2. The method as claimed as claim 1, wherein after the acquiring the network information of the plurality of vehicular networks and the service information born by each vehicular network, the method further comprises:
sequencing each acquired vehicular network according to importance of at least one service born by each acquired vehicular network; and
determining a priority sequence of each sequenced vehicular network.

3. The method as claimed in claim 1, wherein after the acquiring the at least one vehicular network set with the coexisting services according to the determination result, the method further comprises:
sequencing each acquired vehicular network set according to service importance of at least one vehicular network contained in each acquired vehicular network set; and
determining a priority sequence of each sequenced vehicular network set.

4. The method as claimed in claim 1, wherein after the dividing the network into the n virtual sub-networks according to the at least one vehicular network set, the method further comprises:
during a process of performing data transmission by use of at least one vehicular network, performing the data transmission according to a priority sequence of each sequenced vehicular network set.

5. The method as claimed in claim 1, wherein after the dividing the networks into the n virtual sub-networks according to at least one vehicular network set, the method further comprises:
during a process of performing data transmission by use of each vehicular network contained in a vehicular network set, performing the data transmission according to a priority sequence of each sequenced vehicular network in this vehicular network set.

6. A multi-network convergence device, comprising: a hardware processor coupled with a memory and configured to execute program components stored on the memory, wherein the program components comprise:

an acquisition component, configured to acquire network information of a plurality of vehicular networks and service information born by each vehicular network, wherein the service information at least comprises at least one service feature and service importance, the at least one service feature is used for representing at least one service type born by each vehicular network and the service importance is used for representing importance of at least one service born by each vehicular network;

a determination component, configured to determine whether the at least one service born by a first vehicular network coexists with at least one service born by the other vehicular networks or not according to the service information, wherein the first vehicular network is any one of the plurality of vehicular networks; and an execution component, configured to acquire at least one vehicular network set with coexisting services according to a determination result, wherein the vehicular network set is a set comprising at least one vehicular network with the same service feature type;

wherein the execution component comprises: a first execution sub-component, configured to, when at least one second vehicular network of which at least one service coexists with at least one service born by the first vehicular network, acquire a vehicular network set comprising the first vehicular network and the at least one second vehicular network; and a second execution sub-component, configured to, when the at least one second vehicular network of which the at least one service does not coexists with the at least one service born by the first vehicular network does not exist, directly determine the first vehicular network as an independent vehicular network set;

wherein the program components further comprise: a statistical component, configured to count and determine a number n of the at least one vehicular network set, wherein n is a positive integer larger than 0; and a third processing component, configured to divide a network into n virtual sub-networks according to at least one vehicular network set, wherein the virtual sub-networks are the same as the at least one vehicular networks contained in a corresponding vehicular network set.

7. The device as claimed as claim 6, wherein the program components further comprise:
a first processing component, configured to sequence each acquired vehicular network according to the importance of at least one service born by each acquired vehicular network; and
a first determination component, configured to determine a priority sequence of each sequenced vehicular network.

8. The device as claimed in claim 6, wherein the program components further comprise:
a second processing component, configured to sequence each acquired vehicular network set according to service importance of at least one vehicular network contained in each acquired vehicular network set; and
a second determination component, configured to determine a priority sequence of each sequenced vehicular network set.

9. The device as claimed in claim 6, wherein the program components further comprise:
a first transmission component, configured to, during a process of performing data transmission by use of at least one vehicular network, perform the data transmission according to a priority sequence of each sequenced vehicular network set.

10. The device as claimed in claim 6, wherein the program components further comprise:
a second transmission component, configured to, during a process of performing data transmission by use of each vehicular network contained in a vehicular network set, perform the data transmission according to a priority sequence of each sequenced vehicular network in this vehicular network set.

\* \* \* \* \*